US012177213B2

(12) United States Patent
Neilan

(10) Patent No.: US 12,177,213 B2
(45) Date of Patent: *Dec. 24, 2024

(54) METHOD AND SYSTEM FOR SECURING COMMUNICATIONS BETWEEN A LEAD DEVICE AND A SECONDARY DEVICE

(71) Applicant: ShopperTrak RCT LLC, Chicago, IL (US)

(72) Inventor: Spencer Neilan, Chicago, IL (US)

(73) Assignee: SHOPPERTRAK RCT LLC, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/356,234

(22) Filed: Jun. 23, 2021

(65) Prior Publication Data
US 2021/0344676 A1 Nov. 4, 2021

Related U.S. Application Data

(63) Continuation of application No. 16/121,101, filed on Sep. 4, 2018, now Pat. No. 11,075,906.
(Continued)

(51) Int. Cl.
*G06F 21/00* (2013.01)
*H04L 9/08* (2006.01)
(Continued)

(52) U.S. Cl.
CPC ........ *H04L 63/0876* (2013.01); *H04L 9/0877* (2013.01); *H04L 9/30* (2013.01); *H04L 9/3226* (2013.01); *H04L 63/083* (2013.01)

(58) Field of Classification Search
CPC ..... H04L 63/0876; H04L 9/0877; H04L 9/30; H04L 9/3226; H04L 63/083; H04L 63/168
See application file for complete search history.

(56) References Cited

U.S. PATENT DOCUMENTS

2005/0120204 A1\* 6/2005 Kiwimagi ............. H04L 63/061
726/4
2007/0250904 A1\* 10/2007 Waller ................ H04L 63/0435
726/1
(Continued)

FOREIGN PATENT DOCUMENTS

CN 1351789 A 5/2002
CN 1722658 A 1/2006
(Continued)

OTHER PUBLICATIONS

Extended European Search Report issued in corresponding International Application No. PCT/US2018/067081 dated Sep. 7, 2021.

*Primary Examiner* — Ghazal B Shehni
(74) *Attorney, Agent, or Firm* — ArentFox Schiff LLP

(57) ABSTRACT

Techniques for establishing a secure connection between a lead device and a secondary device are disclosed herein. According to an embodiment, the lead device receives a request to establish a secure connection with the secondary device. The lead device determines whether the secure connection is an initial connection with the secondary device. In response to a determination that the secure connection is not an initial connection with the secondary device, the lead device authenticates the secondary device using one or more credentials associated with the secondary device and stored by the lead device. In response to a successful authentication using the one or more credentials, the lead device establishes the secure connection with the secondary device.

17 Claims, 4 Drawing Sheets

Related U.S. Application Data

(60) Provisional application No. 62/611,522, filed on Dec. 28, 2017.

(51) Int. Cl.
*H04L 9/30* (2006.01)
*H04L 9/32* (2006.01)
*H04L 9/40* (2022.01)

(56) References Cited

U.S. PATENT DOCUMENTS

| | | | |
|---|---|---|---|
| 2008/0022377 A1* | 1/2008 | Chen | H04L 63/08 726/5 |
| 2010/0114389 A1* | 5/2010 | Chatterton | H02J 9/005 700/297 |
| 2011/0143779 A1* | 6/2011 | Rowe | H04M 3/42348 455/456.3 |
| 2011/0238994 A1 | 9/2011 | Baentsch et al. | |
| 2012/0155643 A1 | 6/2012 | Hassan et al. | |
| 2012/0284786 A1 | 11/2012 | Somani et al. | |
| 2015/0071139 A1 | 3/2015 | Nix | |
| 2015/0082039 A1 | 3/2015 | Stalzer et al. | |
| 2015/0229612 A1 | 8/2015 | Hassan et al. | |
| 2015/0244712 A1* | 8/2015 | Iwanski | H04L 63/0823 713/153 |
| 2015/0304113 A1 | 10/2015 | Nix | |
| 2015/0350181 A1* | 12/2015 | Call | H04L 63/0846 726/6 |
| 2017/0099280 A1* | 4/2017 | Goel | H04L 67/146 |
| 2017/0215213 A1 | 7/2017 | Lee et al. | |
| 2018/0041343 A1* | 2/2018 | Chen | H04W 4/70 |

FOREIGN PATENT DOCUMENTS

| | | |
|---|---|---|
| CN | 1816997 A | 8/2006 |
| CN | 101340705 A | 1/2009 |
| CN | 101588245 A | 11/2009 |
| CN | 101765998 A | 6/2010 |
| CN | 102017578 A | 4/2011 |
| CN | 102315942 A | 1/2012 |
| CN | 102624740 A | 8/2012 |
| CN | 102799544 A | 11/2012 |
| CN | 103503408 A | 1/2014 |
| CN | 104348686 A | 2/2015 |
| CN | 105530596 A | 4/2016 |
| CN | 105722013 A | 6/2016 |
| CN | 105871867 A | 8/2016 |
| CN | 106162537 A | 11/2016 |
| CN | 106257861 A | 12/2016 |
| CN | 106537943 A | 3/2017 |
| CN | 106713298 A | 5/2017 |
| CN | 107046687 A | 8/2017 |
| CN | 107317796 A | 11/2017 |
| CN | 107431701 A | 12/2017 |
| EP | 1754158 A1 | 2/2007 |
| WO | 2017059400 A1 | 4/2017 |

* cited by examiner

METHOD AND SYSTEM FOR SECURING COMMUNICATIONS BETWEEN A LEAD DEVICE AND A SECONDARY DEVICE

CROSS-REFERENCE TO RELATED APPLICATIONS

This application is a Continuation of U.S. patent application Ser. No. 16/121,101, filed Sep. 4, 2018, which claims benefit of priority to U.S. Provisional Patent Application No. 62/611,522, filed Dec. 28, 2017, the content of which are herein incorporated by reference in their entirety.

BACKGROUND

Embodiments disclosed herein generally relate to data encryption, and more particularly, to data encryption between devices connected with a network (e.g., a local area network, wide area network, and so on).

Generally, a counting system may track objects, such as individuals passing through a given area, and maintain a count of each object. The counting system may include multiple devices that serve various functions. For example, the counting system can be configured with a lead device and one or more secondary devices connected with the lead device over a network. The secondary device may include sensors (e.g., cameras, motion detection components, etc.) to obtain raw data, such as image data, and transmit the data to the lead device. The lead device itself may process the data, e.g., by distinguishing foreground objects from background objects, distinguishing individuals from other foreground objects, and counting the individuals. For security and privacy, it is desired to protect the data as it is transmitted between the devices.

SUMMARY

Embodiments disclosed herein provide a method for establishing a secure connection between a lead device and a secondary device are disclosed herein. The method generally includes receiving, by one or more processors of the lead device, a request to establish the secure connection with the secondary device. The method also includes determining whether the secure connection is an initial connection with the secondary device. In response to a determination that the secure connection is not an initial connection with the secondary device, the secondary device is authenticated using one or more credentials associated with the secondary device and stored by the lead device. In response to a successful authentication using the one or more credentials, the secure connection is established with the secondary device.

Another embodiment disclosed herein provides a computer-readable storage medium having a plurality of instructions, which, when executed, causes a lead device to receive, by one or more processors of the lead device, a request to establish the secure connection with the secondary device. The instructions also cause the lead device to determine whether the secure connection is an initial connection with the secondary device. In response to a determination that the secure connection is not an initial connection with the secondary device, the lead device authenticates the secondary device using one or more credentials associated with the secondary device and stored by the lead device. In response to a successful authentication using the one or more credentials, the lead device establishes the secure connection with the secondary device.

Yet another embodiment disclosed herein provides a lead device to receive, by one or more processors of the lead device, a request to establish the secure connection with the secondary device. The instructions also cause the lead device to determine whether the secure connection is an initial connection with the secondary device. In response to a determination that the secure connection is not an initial connection with the secondary device, the lead device authenticates the secondary device using one or more credentials associated with the secondary device and stored by the lead device. In response to a successful authentication using the one or more credentials, the lead device establishes the secure connection with the secondary device.

In accordance with these and other objectives that will become apparent hereafter, the present disclosure will be described with particular references to the accompanying drawings.

DETAILED DESCRIPTION

This detailed description is presented in terms of programs, data structures or procedures executed on a computer or a network of computers. The software programs implemented by the system may be written in languages such as JAVA, C, C++, C#, Assembly language, Python, PHP, or HTML. However, one of skill in the art will appreciate that other languages may be used instead, or in combination with the foregoing.

Figure 1:
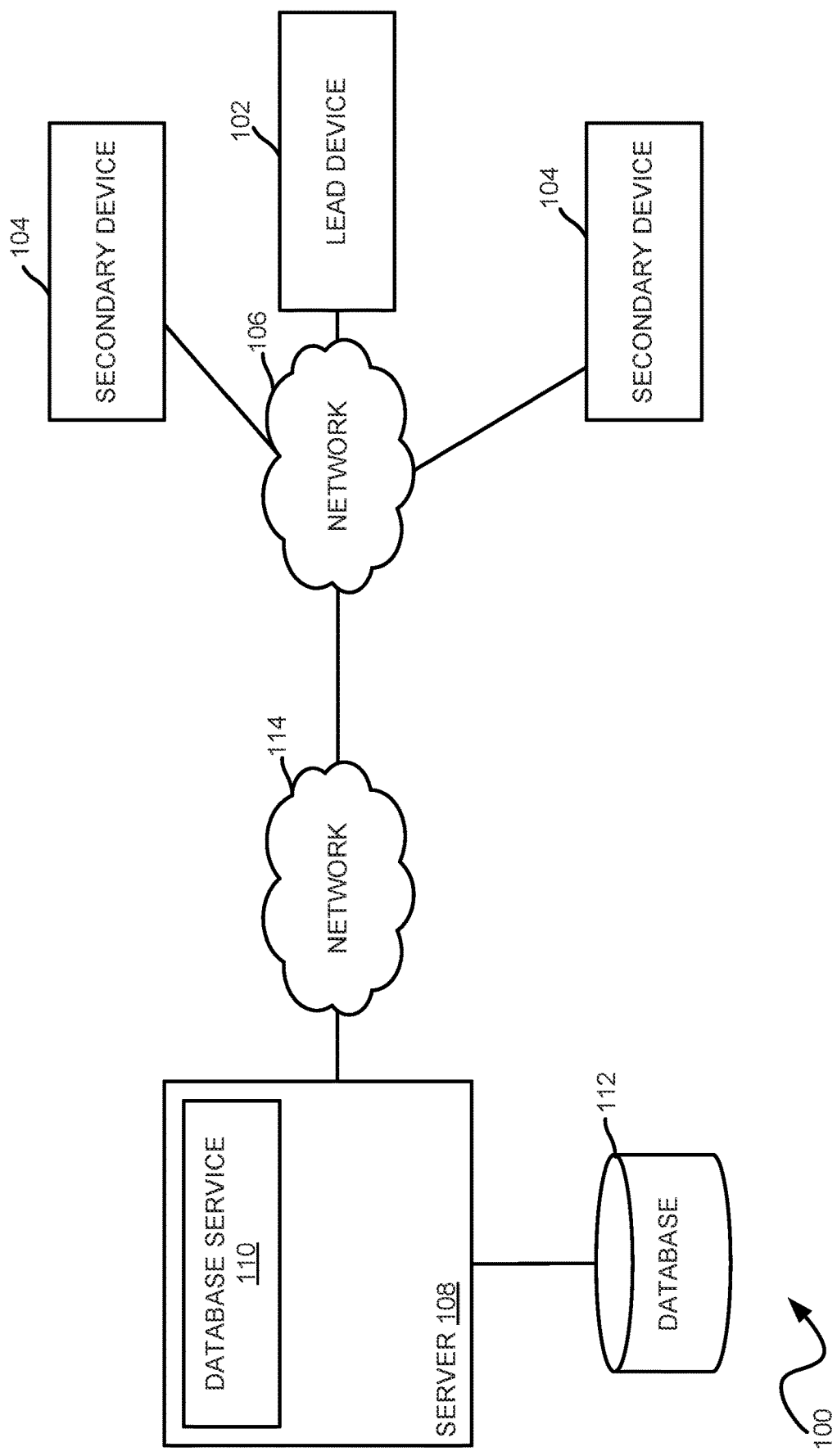
FIG. 1 illustrates an example computing environment in which a lead device is in communication with one or more secondary devices.

FIG. 1 illustrates an example computing environment 100. In some embodiments, the computing environment 100 is representative of a counting system that can be used, e.g., in a retail store or other environment. For instance, the counting system may monitor consumer traffic patterns at facilities such as malls or stores. The counting system may identify objects entering and exiting a given area, track the objects across the area, and maintain a count of those objects passing through the area. As shown, the computing environment 100 includes a lead device 102 and one or more secondary devices 104, each of the devices 102 and 104 interconnected via a network 106. In some embodiments, the network 106 is representative of a local area network (LAN), in which the lead device 102 and secondary devices 104 can be connected wirelessly with one another. Of course, other networks or methods of connection may be contemplated.

The lead device 102 may be representative of a lead camera device that can be connected with a computing system. For example, in an embodiment, the lead device 102 is a ShopperTrak ST600 device that is mounted above an entrance to a retail facility for capturing data, including stereo images, from the entrance. The lead device 102 may include sensors such as a stereoscopic camera unit, motion detection units, and the like. The secondary devices 104 may be representative of other sensor devices that can be connected with a computing system, such as stereoscopic camera devices, motion detection sensor systems, infrared camera systems, and the like. The secondary device 104 may also be representative of a ShopperTrak ST600 mounted at an entrance (or other locations) within the retail facility. The secondary devices 104 may transmit, over the network 106, raw data captured by the sensors therein to the lead device 102. Raw data may include image data, audio/video data, motion data, and the like. The secondary devices 102 can transmit other data include HTTP messages. The lead device 102 may process the raw data received from the secondary devices 104 and also process the raw data obtained from sensors on the lead device 102, such as by identifying foreground and background objects in received image data, determining a presence of individuals in the image data, determining individual tracking data over discrete periods of time, and the like. In one embodiment, the lead device 102 and secondary devices 104 may form a counting device unit.

As further shown, the counting device unit is connected with a server 108 over a network 114 (e.g., a wide area network, the Internet, etc.). The server 108 includes a database service 110 and a database 112 (e.g., a relational database). The database service 110 may manage data maintained in the database 112. In some embodiments, the lead device 102 connects to the server 108 via the network 114 and transmits processed data to the database 112 for storage.

Embodiments presented herein disclose techniques for securely transmitting data between the lead device 102 and secondary devices 104. As further described herein, the lead device 102 and a secondary device 104 may establish a secure connection with one another. For example, in some embodiments, the lead device 102 uses a tunneling protocol, such as the SSH tunnel, to establish the secure connection with the secondary device 104. The SSH tunnel allows the lead device 102 and secondary devices 104 to transmit the data securely with one another. When establishing the secure tunnel, the lead device 102 may use password authentication when initially connecting with a secondary device 104. On subsequent connections, the lead device 102 may use other secure credentials provided by the secondary device 104, such as a public key of the secondary device 104 previously sent to the lead device 102. Doing so allows the lead device 102 to reduce the amount of time used to establish the secure connection.

Figure 2:
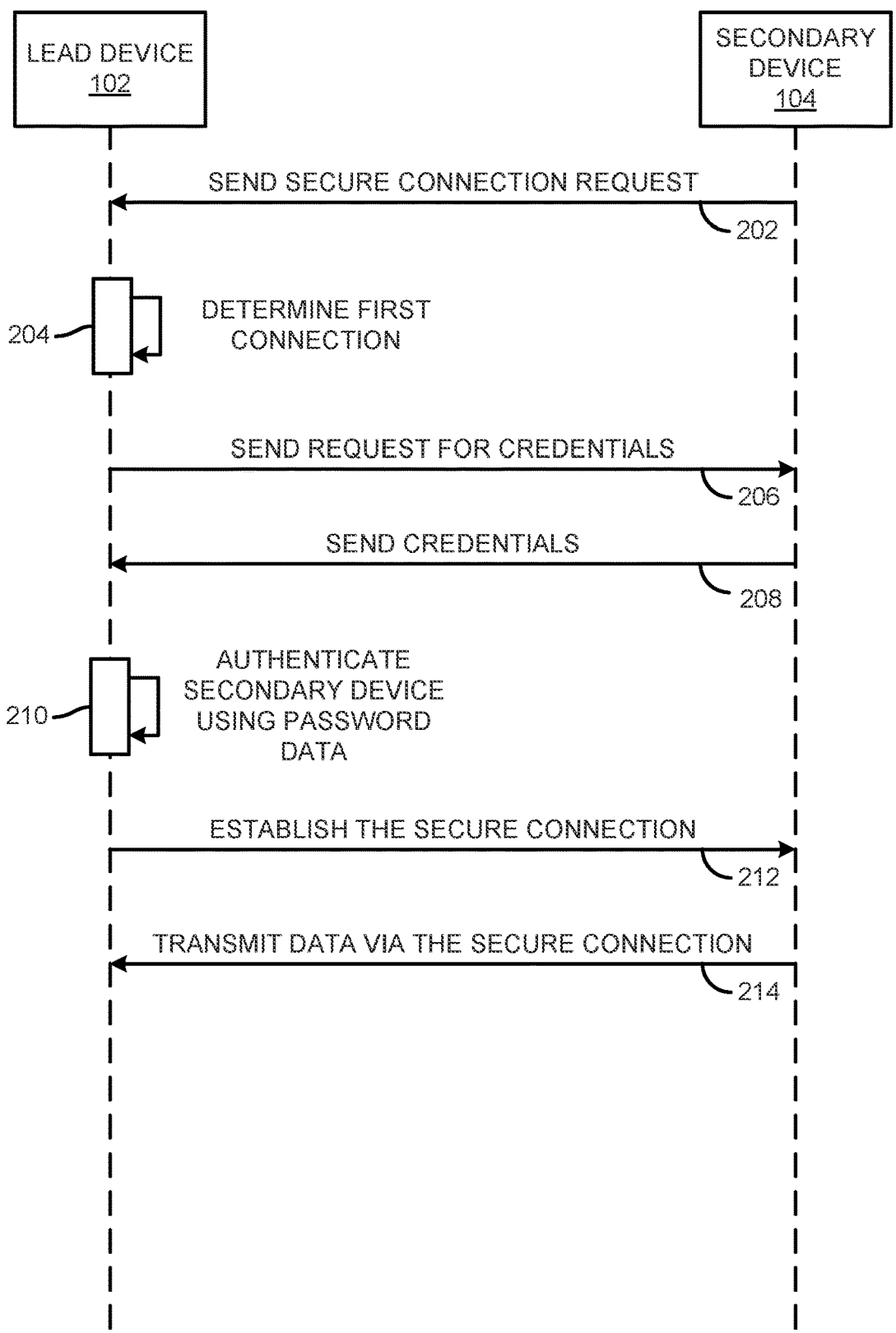
FIG. 2 illustrates an example sequence diagram for at least one embodiment of establishing a secure connection between a lead device and a secondary device.

FIG. 2 illustrates an example diagram of a sequence 200 for at least one embodiment of establishing a secure connection between the lead device 102 and the secondary device 104. In such an example, the lead device 102 (and secondary device 104), during the boot sequence, may generate distinct cryptographic key pairs, if not already generated and stored. Each of the key pairs may be generated using various techniques. For example, the lead device 102 may generate a 2048-bit RSA key pair on a first-time boot up after the device loader phase. The lead device 102 may use the public key of the secondary device 104 to authenticate the secondary device 104 in subsequent sessions.

As shown, the sequence 200 begins at 202, in which the secondary device 104 sends a secure connection request to the lead device 102. For example, the secondary device 104 may do so prior to transmitting data captured by sensors to the lead device 102. In turn, at 204, the lead device 102 determines whether the connection with the secondary device 104 is a first connection (e.g., an initial connection with the secondary device 104). A lead device 102 may determine that the connection between the secondary device 104 is a first connection in a variety of scenarios, including after an upgrade of the lead device 102, in the event that the secondary device 104 is replaced with another secondary device 104, new cryptographic key pairs are generated by either of the lead device 102 or the secondary device 104, and the like. In this example, the lead device 102 determines that the secondary device 104 is a first connection.

At 206, the lead device 102 sends a request for credentials to the secondary device 104. At 208, the secondary device 104 sends credentials to the lead device 102. The credentials may include the public key of the secondary device 104, a password associated with the secondary device 104 that is known to the lead device 102 (e.g., provided in a password or configuration file), and the like. The lead device 102 may associate the public key with the secondary device 104 (e.g., in a configuration file) and store the public key thereon.

At 210, the lead device 102 authenticates the secondary device 104 using password data provided by the secondary device 104. The lead device 102 may perform various password authentication techniques to do so. In this example, assume that the lead device 102 successfully authenticates the secondary device 104. In the event that the password is incorrect, then the lead device 102 may return an error. At 212, the lead device 102 establishes the secure connection. In some embodiments, an SSH signature associated with each of the lead device 102 and the secondary device 104 is unique. To do so, the lead device 102 may determine whether an SSH tunnel connection already exists for the secondary device 104. If so, the lead device 102 may delete the existing tunnels to close the secure connection. The lead device 102 may then initialize an SSH tunnel using a network address of the secondary device 104 (e.g., an IP address or MAC address), a port number to associate with the tunnel, and public key data associated with the lead device 102 and the secondary device 104. Once established, the lead device 102 may update mapping tables that include a network address of the secondary device 104 and the port associated with the SSH tunnel.

At 214, the secondary device 104 transmits data via the secure connection. Prior to sending the data, the secondary device 104 may encrypt the data using the private key generated by the secondary device 104 (e.g., using various encryption methods). The lead device 102 may receive the encrypted data and decrypt the data using the public key. Note, the steps of sequence 200 corresponding to the lead device 102 may also be performed by the secondary device 104, and vice versa. For example, the lead device 102 may initiate a secure connection request with the secondary device 104, e.g., to transmit HTTP request messages to the secondary device 104.

Figure 3:
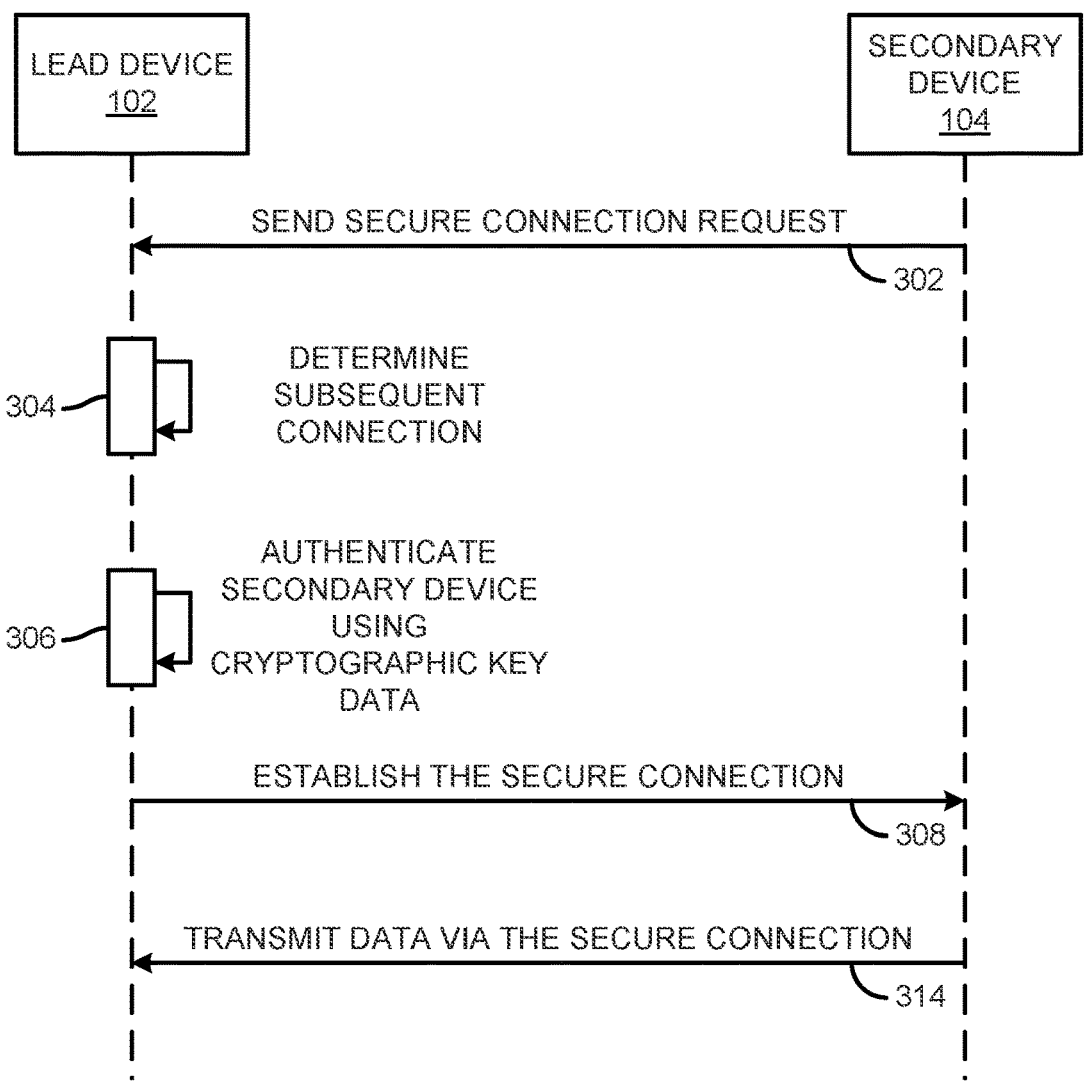
FIG. 3 illustrates another example sequence diagram for at least one embodiment of establishing a secure connection between a lead device and a secondary device.

FIG. 3 illustrates a diagram of a sequence 300 for at least one embodiment of establishing a secure connection between a lead device and a secondary device. At 302, the secondary device 104 sends a secure connection request to lead device 102. At 304, the lead device 102 determines whether the connection is a first connection or a subsequent connection. Instances in which the connection is a first connection are described above. In this example, assume that the connection is not a first connection. At 306, the lead device 102 authenticates the secondary device using cryptographic key data, e.g., the public key previously sent by the secondary device 104. For example, the lead device 102 may engage in a challenge-response protocol with the secondary device 102 based on the public key of the secondary device 104. Assume, for this example, that the lead device 102 successfully authenticates the secondary device 102. In the event that authentication fails, the lead device 102 may return an error or perform password authentication with the secondary device 104. At 308, upon successful authentication of the secondary device 104, the lead device 102 establishes the secure connection with the secondary device 104 (e.g., using techniques described relative to FIG. 2). At 314, the secondary device 104 may transmit data via the secure connection to the lead device 102 (e.g., using techniques described relative to FIG. 2).

Note, the steps of sequence 300 corresponding to the lead device 102 may also be performed by the secondary device 104, and vice versa. For example, the lead device 102 may initiate a secure connection request with the secondary device 104, e.g., to transmit HTTP request messages to the secondary device 104.

In some embodiments, if the lead device 102 sends an HTTP request to a secondary device 104 before a secure connection is established, the secondary device 104 may return an HTTP error. Similarly, if the secondary device 104 sends an HTTP request to the lead device 102 before the secure connection is established, the lead device 102 may return an HTTP error. In such a case, the lead device 102 (or secondary device 104) may perform port forwarding techniques to route HTTP traffic over SSH tunnels between the devices.

Further, in some embodiments, a secure connection (e.g., an SSH tunnel) can be automatically re-established in the event that a secondary device 104 is disconnected from a lead device and subsequently powered back on. For instance, the lead device 102 may determine a threshold time period to determine whether to automatically re-establish the secure connection. In practice, a threshold range of less than two minutes may be effective. Another instance in which a secure connection can be automatically reestablished is if the secondary device 104 is power cycled.

Further still, in some embodiments, the lead device 102 may maintain, for each secondary device 104 in the network, a secure connection for communication messages and another secure connection for control messages. To accomplish this, the lead device 102 may maintain mappings of secure connections associated with each secondary device 104. In some cases, deleting the mappings can temporarily disable communication with affected secondary devices 104. However, in such a case, the lead device 102 may generate new mappings within a predefined period of time. Doing so may restore communication with the secondary devices 104.

Figure 4:
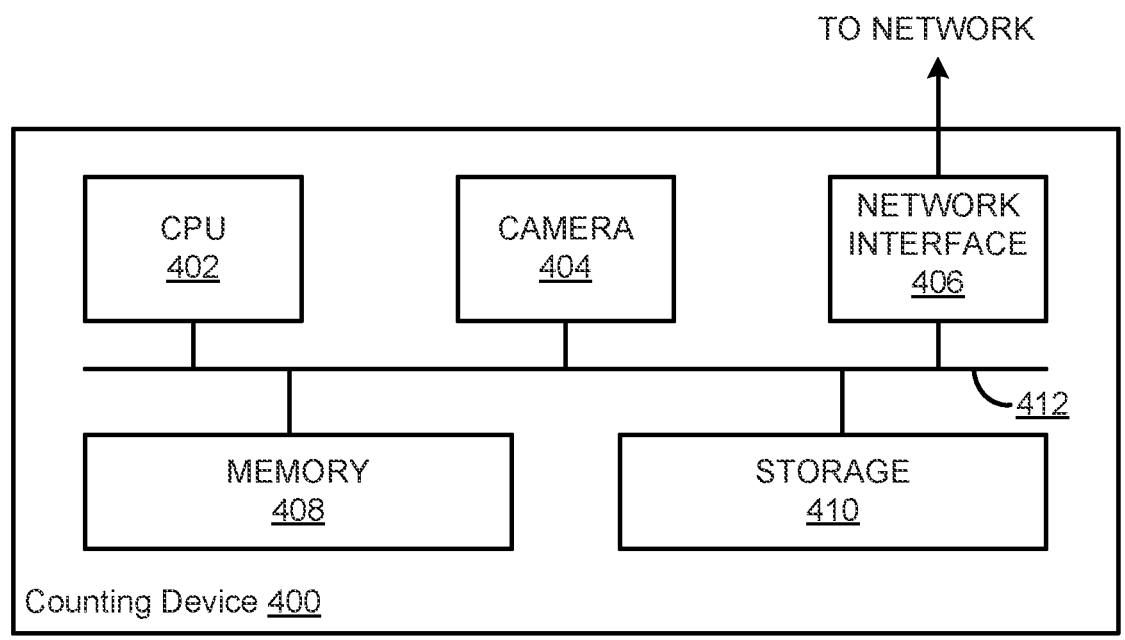
FIG. 4 illustrates an example counting device configured to establish a secure connection with another device.

Referring now to FIG. 4, a block diagram depicting the hardware components of a counting device 400 configured to establish a secure connection with another device are shown. Note, the counting device may be representative of either the lead device 102 or the secondary device 104. As shown, the counting device includes, without limitation, a central processing unit (CPU) 402, a camera 404, a network interface 406, a memory 408, and a storage 410. Each of these components may be interconnected via an interconnect bus 412.

The CPU 402 retrieves and executes programming instructions stored in memory 408 as well as stores and retrieves application data residing in the storage 410. The bus 412 is used to transmit programming instructions and data between CPU 402, storage 410, network interface 406, and memory 408. Note, the CPU 402 is included to be representative of a single CPU, multiple CPUs, a single CPU having multiple processing cores, and the like. The memory 408 is generally included to be representative of a random access memory. The storage 410 may be a disk drive storage device. Although shown as a single unit, storage 410 may be a combination of fixed and/or removable storage devices, such as fixed disc drives, removable memory cards, or optical storage, network attached storage (NAS), or a storage area network (SAN).

The camera 404 includes multiple sensor lenses (e.g., camera lenses) to capture image data, which the storage 410 may temporarily maintain. In some embodiments, the camera 404 is a stereoscopic camera. The memory 408 includes program code logic to direct the camera 404 to capture image data. The program code may also identify individuals in the image data (e.g., using the techniques described above) for counting data and generate height map data for each individual and process the height map data. The network interface 406 may be embodied as any communication circuit, device, or collection thereof, capable of enabling communications over a network between the counting device 400 and other devices.

The memory 408 further includes program code logic to generate cryptographic keys for authenticating the counting device 400 with another device (e.g., the lead device 102 or a secondary device 104) to establish a secure connection with the other device, such as an SSH tunnel. In some embodiments, the counting device 400 may include a secure cryptoprocessor (not shown) to establish a secure environment for generating the cryptographic keys. The secure cryptoprocessor may be, for example, a trusted platform module (TPM). The memory 408 also provides program logic for establishing the secure connection, such as logic to send (or receive) a secure connection request with a target device (e.g., a lead or secondary device), determine whether the secure connection corresponds to a first (e.g., an initial) connection with the target device, send (or receive) a request for credentials, receive (or send) the credentials, authenticate the device using the credentials, and establishing the secure connection to transmit data via the secure connection. The storage 410 may include mapping configurations, e.g., for secure connections to a given device. The storage 410 may also include public keys of other devices forming the counting system.

Aspects of the present disclosure may be embodied as a system, method, or computer-readable storage medium. Accordingly, aspects of the present disclosure may take the form of an entirely hardware-based embodiment, an entirely software-based embodiment (e.g., firmware, resident software, micro-code, etc.), or an embodiment combining software and hardware aspects. Further, aspects of the present disclosure may take the form of a computer-readable storage medium having computer-readable instructions embodied thereon.

Any combination of one or more computer-readable storage media may be used. The computer-readable medium may be a computer-readable signal medium or a computer-readable storage medium. A computer-readable storage medium may include an electronic, magnetic, optical, electromagnetic, infrared, semiconductor system, apparatus, device, or any suitable combination of the foregoing. More specific examples include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer-readable storage medium may be any tangible medium that may contain or store a program for use by or in connection with an instruction execution system, apparatus, or device.

It will be readily understood that components of the embodiments as generally disclosed herein and illustrated in the appended figures could be arranged and designed in a wide variety of different configurations. Thus, the following and more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present disclosure may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present disclosure. Thus, discussions of the features and advantages, and similar language, throughout the specification may, but do not necessarily, refer to the same embodiment.

Furthermore, the described features, advantages and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment of the present invention. Thus, the phrases "in one embodiment", "in an embodiment", and similar language throughout this specification may, but do not necessarily, all refer to the same embodiment. Many modifications and variations are possible in view of the above disclosure. The embodiments were chosen and described to best explain the principles of the present disclosure and practical applications to thereby enable one of ordinary skill in the art to best use the present disclosure as may be suited to the particular use that is contemplated.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to". The features and functions disclosed above, as well as alternatives, may be combined into many other different systems or applications. Various presently unforeseen or unanticipated alternatives, modifications, variations or improvements may be made by those skilled in the art, each of which is also intended to be encompassed by the disclosed embodiments.

What is claimed is:

1. A computer-implemented method for establishing a secure connection between a lead device and a secondary device, the method comprising:
   receiving, by one or more processors of the lead device, a request to establish the secure connection with the secondary device, the request includes a network address of the secondary device;
   requesting and receiving, by the one or more processors and from the secondary device, one or more credentials associated with the secondary device, wherein the one or more credentials comprises password data associated with the secondary device;
   in response to receiving the request and the one or more credentials, by the one or more processors of the lead device, authenticating the secondary device using the received network address and one or more credentials associated with the secondary device and using a network address and one or more credentials associated with the secondary device previously stored by the lead device; and
   in response to a successful authentication using the one or more credentials, establishing the secure connection with the secondary device,
   wherein the lead device and the secondary device forms at least a portion of a counting device counting individuals.

2. The computer-implemented method of claim 1, further comprising:
   in response to an unsuccessful authentication using the one or more credentials, sending an error message from the lead device to the secondary device.

3. The computer-implemented method of claim 1, wherein the network address is an Internet Protocol (IP) address or a Media Access Control (MAC) address.

4. The computer-implemented method of claim 1, wherein the secure connection is indicative of a secure shell (SSH) tunnel.

5. The computer-implemented method of claim 1, wherein the secure connection is a subsequent connection between the lead device and the secondary device.

6. The computer-implemented method of claim 1, wherein the counting device counts individuals passing through a given area.

7. A non-transitory computer-readable storage medium comprising a plurality of instructions, which, when executed on one or more processors, causes a lead device to:
   receive a request to establish a secure connection with a secondary device, the request includes a network address of the secondary device;
   request and receive, by the one or more processors and from the secondary device, one or more credentials associated with the secondary device, wherein the one or more credentials comprises password data associated with the secondary device;
   in response to receiving the request and the one or more credentials, by the one or more processors of the lead device, authenticating the secondary device using the received network address and one or more credentials associated with the secondary device and using a network address and one or more credentials associated with the secondary device previously stored by the lead device; and
   in response to a successful authentication using the one or more credentials, establish the secure connection with the secondary device, wherein the lead device and the secondary device forms at least a portion of a counting device counting individuals.

8. The non-transitory computer-readable storage medium of claim 7, wherein the plurality of instructions further causes the lead device to further comprising:
in response to an unsuccessful authentication using the one or more credentials, send an error message from the lead device to the secondary device.

9. The non-transitory computer-readable storage medium of claim 7, wherein the network address is an Internet Protocol (IP) address or a Media Access Control (MAC) address.

10. The non-transitory computer-readable storage medium of claim 7, wherein the secure connection is indicative of a secure shell (SSH) tunnel.

11. The non-transitory computer-readable storage medium of claim 7, wherein the secure connection is a subsequent connection between the lead device and the secondary device.

12. The non-transitory computer-readable storage medium of claim 7, wherein the counting device counts individuals passing through a given area.

13. A lead device, comprising:
one or more processors; and
a memory storing program code, which, when executed on the one or more processors, causes the lead device to:
receive a request to establish a secure connection with a secondary device, the request includes a network address of the secondary device;
request and receive, by the one or more processors and from the secondary device, one or more credentials associated with the secondary device, wherein the one or more credentials comprises password data associated with the secondary device;
in response to receiving the request and the one or more credentials, authenticating the secondary device using the received network address and one or more credentials associated with the secondary device and using a network address and one or more credentials associated with the secondary device previously stored by the lead device; and
in response to a successful authentication using the one or more credentials, establish the secure connection with the secondary device,
wherein the lead device and the secondary device forms at least a portion of a counting device counting individuals.

14. The lead device of claim 13, wherein the program code further cause the lead device to:
in response to an unsuccessful authentication using the one or more credentials, send an error message from the lead device to the secondary device.

15. The lead device of claim 13, wherein the network address is an Internet Protocol (IP) address or a Media Access Control (MAC) address.

16. The lead device of claim 13, wherein the secure connection is indicative of a secure shell (SSH) tunnel.

17. The lead device of claim 13, wherein the counting device counts individuals passing through a given area.

* * * * *